(12) United States Patent
Boyce et al.

(10) Patent No.: US 11,303,923 B2
(45) Date of Patent: Apr. 12, 2022

(54) AFFINE MOTION COMPENSATION FOR CURRENT PICTURE REFERENCING

(71) Applicant: Intel Corporation, Santa Clara, CA (US)

(72) Inventors: Jill Boyce, Portland, OR (US); Zhipin Deng, Beijing (CN); Lidong Xu, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/437,158

(22) Filed: Jun. 11, 2019

(65) Prior Publication Data

US 2019/0387250 A1 Dec. 19, 2019

Related U.S. Application Data

(60) Provisional application No. 62/685,458, filed on Jun. 15, 2018.

(51) Int. Cl.

| | |
|---|---|
| *H04N 19/523* | (2014.01) |
| *H04N 19/573* | (2014.01) |
| *H04N 19/543* | (2014.01) |
| *H04N 19/52* | (2014.01) |
| *H04N 19/597* | (2014.01) |

(52) U.S. Cl.
CPC ......... *H04N 19/523* (2014.11); *H04N 19/52* (2014.11); *H04N 19/543* (2014.11); *H04N 19/573* (2014.11); *H04N 19/597* (2014.11)

(58) Field of Classification Search
None
See application file for complete search history.

(56) References Cited

U.S. PATENT DOCUMENTS

| | | | | |
|---|---|---|---|---|
| 6,970,591 | B1* | 11/2005 | Lyons | G06K 9/209 345/419 |
| 10,944,962 | B2* | 3/2021 | Kang | H04N 19/119 |
| 2014/0064458 | A1* | 3/2014 | Jobst | A61B 6/00 378/207 |
| 2015/0264390 | A1* | 9/2015 | Laroche | H04N 19/105 375/240.16 |
| 2017/0310961 | A1* | 10/2017 | Liu | H04N 19/107 |
| 2018/0109810 | A1* | 4/2018 | Xu | H04N 19/11 |
| 2018/0199052 | A1* | 7/2018 | He | H04N 19/176 |
| 2018/0316929 | A1* | 11/2018 | Li | H04N 19/105 |
| 2019/0045212 | A1* | 2/2019 | Rose | H04N 19/59 |
| 2019/0158849 | A1* | 5/2019 | Yu | G06T 7/0002 |
| 2019/0238853 | A1* | 8/2019 | Galpin | H04N 19/119 |

(Continued)

OTHER PUBLICATIONS

Search Report IP.com.*

(Continued)

*Primary Examiner* — Mohammad J Rahman
(74) *Attorney, Agent, or Firm* — Jaffery Watson Mendonsa & Hamilton LLP

(57) ABSTRACT

Embodiments are generally directed to affine motion compensation for current picture referencing. An embodiment of an apparatus includes one or more processors for processing of data; a memory for storage of data including video data; and an encoder for encoding of video data to generate encoded video data, wherein the encoder includes a component to provide affine motion compensation for current picture references in the video data.

14 Claims, 8 Drawing Sheets

(56) References Cited

U.S. PATENT DOCUMENTS

| | | | | |
|---|---|---|---|---|
| 2019/0281319 A1* | 9/2019 | Galpin | ............... | H04N 19/182 |
| 2019/0349598 A1* | 11/2019 | Aminlou | ............. | H04N 19/105 |
| 2020/0021837 A1* | 1/2020 | Ikai | ..................... | H04N 19/46 |
| 2020/0045336 A1* | 2/2020 | Xiu | ....................... | H04N 19/563 |
| 2020/0288171 A1* | 9/2020 | Hannuksela | ......... | H04N 13/128 |
| 2020/0389676 A1* | 12/2020 | Denoual | .............. | H04N 19/70 |

OTHER PUBLICATIONS

H. Cheung and W. Siu, "Local affine motion prediction for H.264 without extra overhead," Proceedings of 2010 IEEE International Symposium on Circuits and Systems, Paris, 2010, pp. 1555-1558, doi: 10.1109/ISCAS.2010.5537406.*

L. Li, Z. Li, M. Budagavi and H. Li, "Projection based advanced motion model for cubic mapping for 360-degree video," 2017 IEEE International Conference on Image Processing (ICIP), Beijing, China, 2017, pp. 1427-1431, doi: 10.1109/ICIP.2017.8296517.*

* cited by examiner

Affine Motion Compensation
for Current Picture Referencing

AFFINE MOTION COMPENSATION FOR CURRENT PICTURE REFERENCING

CROSS-REFERENCE

This application claims priority to U.S. Provisional Application Ser. No. 62/685,458, filed Jun. 15, 2018 and entitled "Affine Motion Compensation for Current Picture Referencing", the entire contents of which are hereby incorporated herein by reference.

TECHNICAL FIELD

Embodiments described herein generally relate to the field of data processing and, more particularly, affine motion compensation for current picture referencing.

BACKGROUND

In general, motion compensation is an algorithmic technique that is used to predict a frame in a video, given the previous and/or future frames by accounting for motion of the camera and/or objects in the video. Motion compensation is employed in the encoding of video data for video compression and describes a picture in terms of the transformation of a reference picture to the current picture.

With regard to motion compensation, an affine transformation is a function between affine spaces that preserves points, straight lines and planes, and sets of parallel lines will remain parallel after an affine transformation. An affine space is a geometric structure that generalizes some of the properties of Euclidean spaces in such a way that these are independent of the concepts of distance and measure of angles, keeping only the properties related to parallelism and ratio of lengths for parallel line segments.

However, conventional technology generally cannot be used with affine motion compensation mode as such techniques fail to offer support for current picture referencing. Further, 360° projection formats, such as cube map projection (CMP) or its variants, that introduce discontinuities at cube faces are particularly inefficient in certain frames.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are generally directed to affine motion compensation for current picture referencing.

In some embodiments, an apparatus, system, or process provides a novel technology for affine motion compensation for current picture referencing. In some embodiments, an affine motion compensation mode is applied for current picture referencing.

Affine motion compensation mode ("affine mode") has been proposed for use with new standards for inter-prediction, such as Versatile Video Coding (VVC/H.266), and has been discussed with reference to Joint Exploration Model (JEM) (by ISO/IEC and ITU-T). However, conventional technology generally cannot be used with affine motion compensation mode as such techniques fail to offer support for current picture referencing.

Affine mode may be selected on an individual block basis in P or B frames and when used, a simplified affine transform is applied to the motion vector prediction of the block for motion compensated prediction. (Three types of frames used in video compression are I-frames (Intra-code picture) providing a complete image, P-frames (Predicted picture) holding only changes in an image from a previous frame, and B-frames (Bidirectional predicted picture) holding only differences between the current frame and both the preceding and following frames.)

Figure 1:
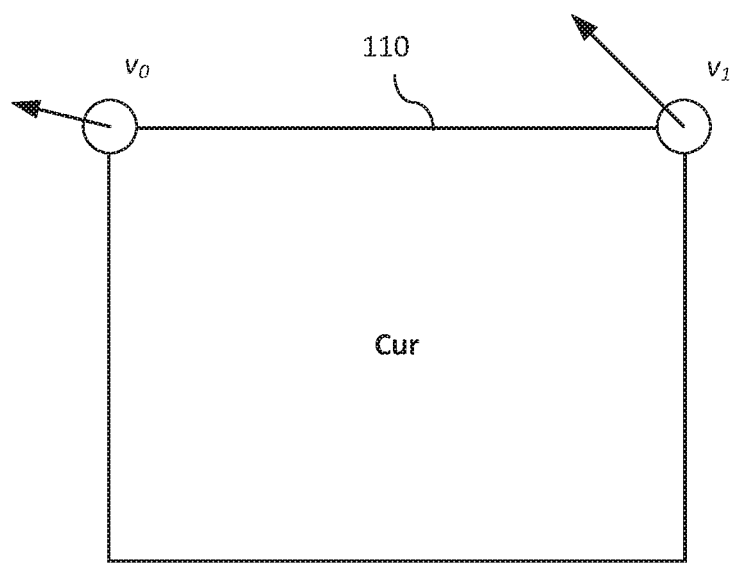
FIG. 1 is an illustration of a simplified affine motion model.

FIG. 1 is an illustration of a simplified affine motion model. Affine motion compensation prediction ("affine prediction") in JEM may be summarized as follows: The affine motion field of a block is described by two control point motion vectors, which are signaled in the bitstream. For example, in FIG. 1 the affine motion model 100 is illustrated with regard to a block 110 in terms of two vectors at corner control points to describe the motion of the block, the vectors being $v_0$ (for the top-left control point) and $v_1$ (for the top-right control point).

The motion vector field (MVP) of a block 110 is described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x - \frac{(v_{1x} - v_{0x})}{w}y + v_{0y} \end{cases} \quad [1]$$

Where $(v_{0x}, v_{0y})$ is a motion vector of the top-left corner control point, and $(v_{1x}, v_{1y})$ is a motion vector of the top-right corner control point.

For example, the JEM includes support for locally adaptive motion vector resolution (LAMVR), where motion vector differences (MVD) can be coded in units of quarter luma samples, integer luma samples, or four luma samples, etc., (where luma refers to brightness in an image) such that an MVD resolution is controlled at the coding unit (CU) level, while any MVD resolution flags are conditionally signaled for each CU that has at least one non-zero MVD components.

Further, for example, the screen content coding (SCC) extension to high efficiency video coding (HEVC) includes a tool for current picture referencing, also called "intra block copy", in which block translational motion prediction from within the current picture is supported. When, for example, sps_curr_pic_ref_enabledJlag in the SPS SCC extension is equal to 1, the current picture may be added to the reference picture list. In HEVC's SCC extension, motion vectors with intra block copy are integer pixel precision, i.e., sub-pel (less than pixel) motion vectors are not used. Further, restrictions are placed on the motion vector values such that only the areas that have already been decoded in the current picture are referenced, and no reference is made to the current CU (Coding unit). For example, equations [2] and [3] below are used to impose such restrictions, where at least one of the two equations is met:

$$BVx+\text{offset}X+nPbSw+xPbs-xCbs \leq 0 \quad [2]$$

$$BVy+\text{offset}Y+nPbSh+yPbs-yCbs \leq 0 \quad [3]$$

Where:
- $(BVx, BVy)$ is the luma block vector for the current PU (Prediction Unit);
- $nPbSw$ and $nPbSh$ are respectively the luma width and height of the current PU;
- $(xPbs, yPbs)$ is the location of the top-left luma sample of the current PU relative to the current picture; and
- $(xCbs, yCbs)$ is the location of the top-left luma sample of the current CU relative to the current picture.

An additional constraint is applied to avoid the need to refer to samples for chroma sample interpolation, when, for example, 4:4:4 is not used, where offset X and offset Y are two adjusted offsets in two dimensions in consideration of chroma sample interpolation:

$$(xPbs+BVx+\text{offset}X+nPbSw-1)/CtbSizeY-xCbs/Ctb\text{-}SizeY \leq yCbs/CtbSizeY-(yPbs+BVy+\text{offset}Y+nPbSh-1)/CtbSizeY \quad [4]$$

Figure 2:
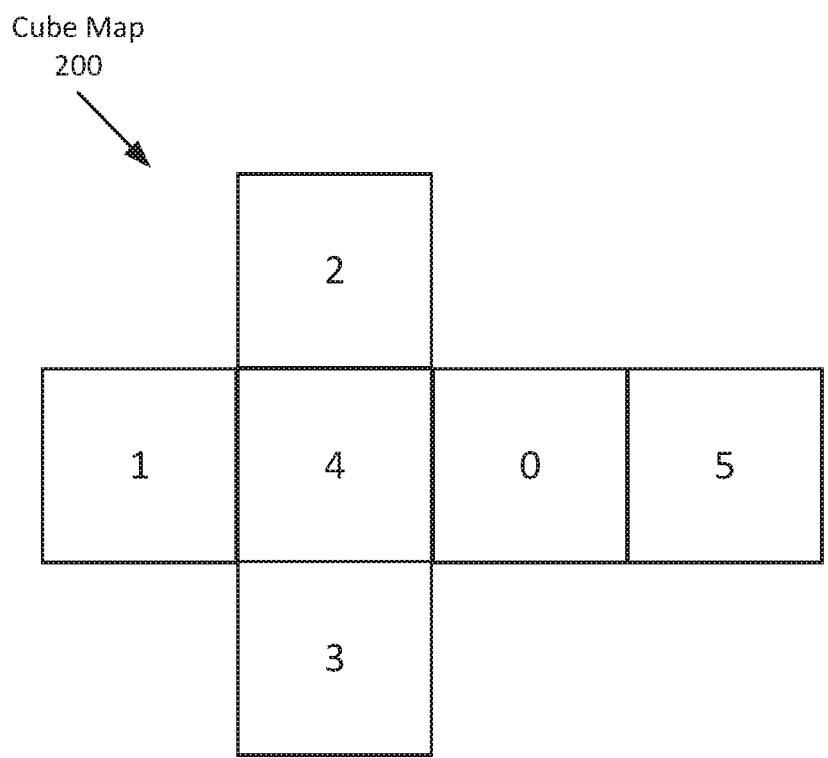
FIG. 2 is an illustration of a cube map projection.
Figure 3:
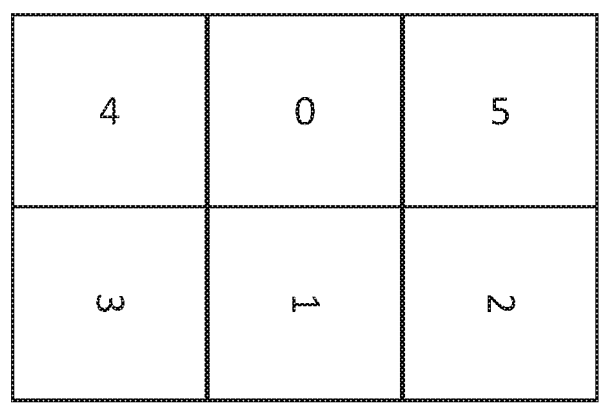
FIG. 3 is an illustration of cube map projection frame packing.

FIG. 2 is an illustration of a cube map projection. In general cube mapping is a method of environment mapping that uses the six faces of a cube (as denoted by face index values 0-5) as the map shape. For example, cube map 200 illustrates cube faces as unfolding from a cube. FIG. 3 is an illustration of cube map projection frame packing. A JVET implementation for cube map projection (CMP), as illustrated in FIG. 2 as CMP3×2 frame packing 300, includes rotation of certain of the cube faces and, along the edges of the cube faces, certain areas that are neighboring in the spherical video represented by the sphere are not neighboring in the cube map projection and are rotated by 90°.

In some embodiments, an apparatus, system, or process includes performance of intra prediction across the cube face boundaries. This thus may necessitate that both the encoder and decoder are aware of the cube face layout, including cube face locations, discontinuities, and rotations, thus necessitating changes to decoder operation.

Table 1 provides 3D coordinates (X, Y, Z) for the packed frames, given the position (u, v) (referring to texture coordinates) and the face index f of each of the cube faces such as illustrated in FIG. 3:

TABLE 1

| (X, Y, Z) Derivation Given (u, v) and the Face Index f | | | |
|---|---|---|---|
| f | X | Y | Z |
| 0 | 1.0 | −v | −u |
| 1 | −1.0 | −v | u |
| 2 | u | 1.0 | v |
| 3 | u | −1.0 | −v |
| 4 | u | −v | 1.0 |
| 5 | −u | −v | 1.0 |

However, conventional technology does not provide support for current picture reference (e.g., intra block copy) and it is not capable of being combined with affine motion compensation mode. Further, 360° projection formats, such as cube map projection or its variants such as Equi-Angular Cubemap (EAC), introduce discontinuities at cube faces and are particularly inefficient in certain frames, such as I-frames. Such an approach necessitates special changes to the decoder to support affine motion, and further necessitates explicit signaling in the bitstream of the cube map layout, including rotation.

Affine Motion Compensation

In some embodiments, an apparatus, system, or process provides affine motion compensation for current picture referencing. In some embodiments, an affine motion compensation mode is applied to current picture referencing. When a cube map projection format is applied, the affine model parameters may be used to specifically target any cube face edges such that any spherical spatial neighboring pixels are referenced.

In some embodiments, an apparatus, system, or process providing affine motion compensation enables improvement in objective and subjective video quality, and is capable of being incorporated into new video coding standards, such as VVC/H.266. In some embodiments, an apparatus, system, or process further enables improvement in video coding efficiency, such as when included in a video coding standard (e.g., VVC/H.266). Coding of omnidirectional 360° video is improved when, for example, cube map projection is used. In some embodiments, components of a decoder designed for inter-frame affine prediction may be re-applied to intra current picture referencing with affine motion compensation mode.

Figure 4:
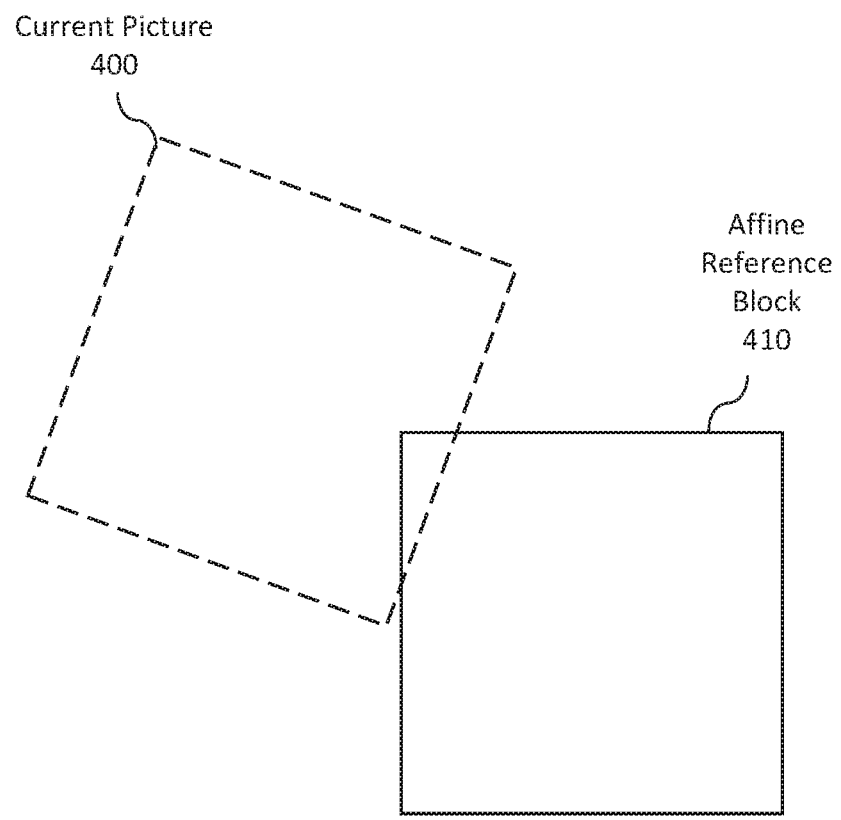
FIG. 4 is an illustration of affine motion compensation for current picture referencing according to some embodiments.

FIG. 4 is an illustration of affine motion compensation for current picture referencing according to some embodiments. As illustrated a current picture 400 may be referenced in relation to an affine reference block 410. In some embodiments, high-level syntax in a sequence or picture parameter set includes separate flags to indicate the use of affine mode and the use of current picture referencing (such as for current picture 400), where a profile is defined such that it allows for the use of these tools together. For example, locally adaptive motion vector resolution (LAMVR) may be used with current picture referencing to locally switch the resolution of motion vector differences. This enables sub-pel motion vector resolution for some blocks when current picture referencing is used, in contrast with HEVC's SCC extension.

For affine motion compensation, the actual motion vector used at each sample position may vary, depending upon the two control point motion vectors, $v_0$ and $v_1$. The motion vector for each sample position may be constrained not to reference samples in the current picture that have not already been decoded. For example, a semantic bitstream constraint may be applied to ensure that these conditions are met. The motion vectors for the four corner sample positions in the block may be tested to ensure these obey the constraint for both equations (equations [2] and [3] provided above), which may be sufficient to ensure that the samples within the block obey the constraint. If, for example, one or both equations are not met for one or more of the block corners, additional tests may be executed for other positions in the block.

Similarly, additional methods may be used to check if all samples needed for the reference are available. In a particular implementation, a method may include looping over each sub-block in the current block, calculating the position of its reference sub-block, and checking the top-right and bottom-right points of the reference sub-block to determine it is in a valid area.

In some embodiments, the following two decision processes are to be considered:

(1) If one of the reference pixel positions or sub-blocks is in invalid area, then the intra affine mode may not be applied to the whole block, where the check order of pixels or sub-blocks may be from right column to left column, since the rightmost of a block is regarded as easier to disobey the constraint; or (2) If some of the reference pixel positions or sub-blocks are in invalid area, the intra affine mode can still be used for the current block, where duplicating, padding, or blending of neighboring pixels in the available region may be used here to generate a reference block. If, for example, a majority of the reference pixels or sub-blocks are in the invalid area, then the intra affine mode may not be applied to the current block.

In some embodiments, when affine mode is used with current picture reference, and because sub-pel resolution is allowed, the restriction on allowable motion vectors is modified from what was used in HEVC for SCC, to avoid referencing neighboring samples that are not available at the decoder. For example, the equations shown below are modified from the SCC equations to consider the width of the sub-pel interpolation filter, by adding the terms fSw and fSh, corresponding to the size of the interpolation filter, in terms of width and height, respectively, to represent the number of additional samples needed beyond the current sample. For example, a 7×7-tap sub-pel interpolation filter may have fSw=fSh=3. The number of filter taps may vary when locally adaptive motion vector resolution (LAMVR) is used, such as for integer to 4-pixel motion vector resolution, FsW=fSh=0, because sub-pel interpolation may not be performed.

$$BVx+\text{offset}X+nPbSw+xPbs-xCbs+fSw \leq 0 \quad [4]$$

$$BVy+\text{offset}Y+nPbSh+yPbs-yCbs+fSh \leq 0 \quad [5]$$

For non-4:4:4 formats, such as YUV 4:2:0 and YUV 4:2:2 color formats, the prior constraint equation for chroma sample interpolation may be updated, such as to consider reference samples for chroma sub-pel positions.

In some embodiments, when used with cube map projection content, the encoder is aware of cube face locations, discontinuities, and rotations. Further, any correspondence between the location of a pixel in the coded cube map projection format and its spherical neighboring locations are accounted for when selected search neighborhoods for motion estimation for the affine control point motion vectors. Any relative rotation in the coded cube map projection format of a given cube face versus a spherical neighboring cube face may also be accounted for when selecting the affine control point motion vectors to make it more likely that the control point vectors apply a rotation when predicting from a cube face with a different relative rotation.

In some embodiments, for pixels along the edge of a cube face with a discontinuity from the neighboring samples in the coded picture, LAMVR may be used to indicate integer pel motion vector differences to avoid sub-pel filter computations that use pixels from discontinuous faces.

Further, for use with temporal motion vector prediction, current picture referencing control point motion vectors are stored, where the temporal motion vector prediction algorithm is changed so that in later coded non-Random Access Point (non-RAP) pictures in the coded video sequence, the MVs used in current picture referencing can be used for temporal motion vector prediction for blocks using current picture referencing, but not for other intercoded blocks. For blocks using current picture referencing, the control point motion vectors are likely to be correlated for the same block locations across pictures, such as for case when cube map projection formats are used. However, current picture referencing motion vectors are not correlated with other intercoded blocks in other pictures.

Figure 5:
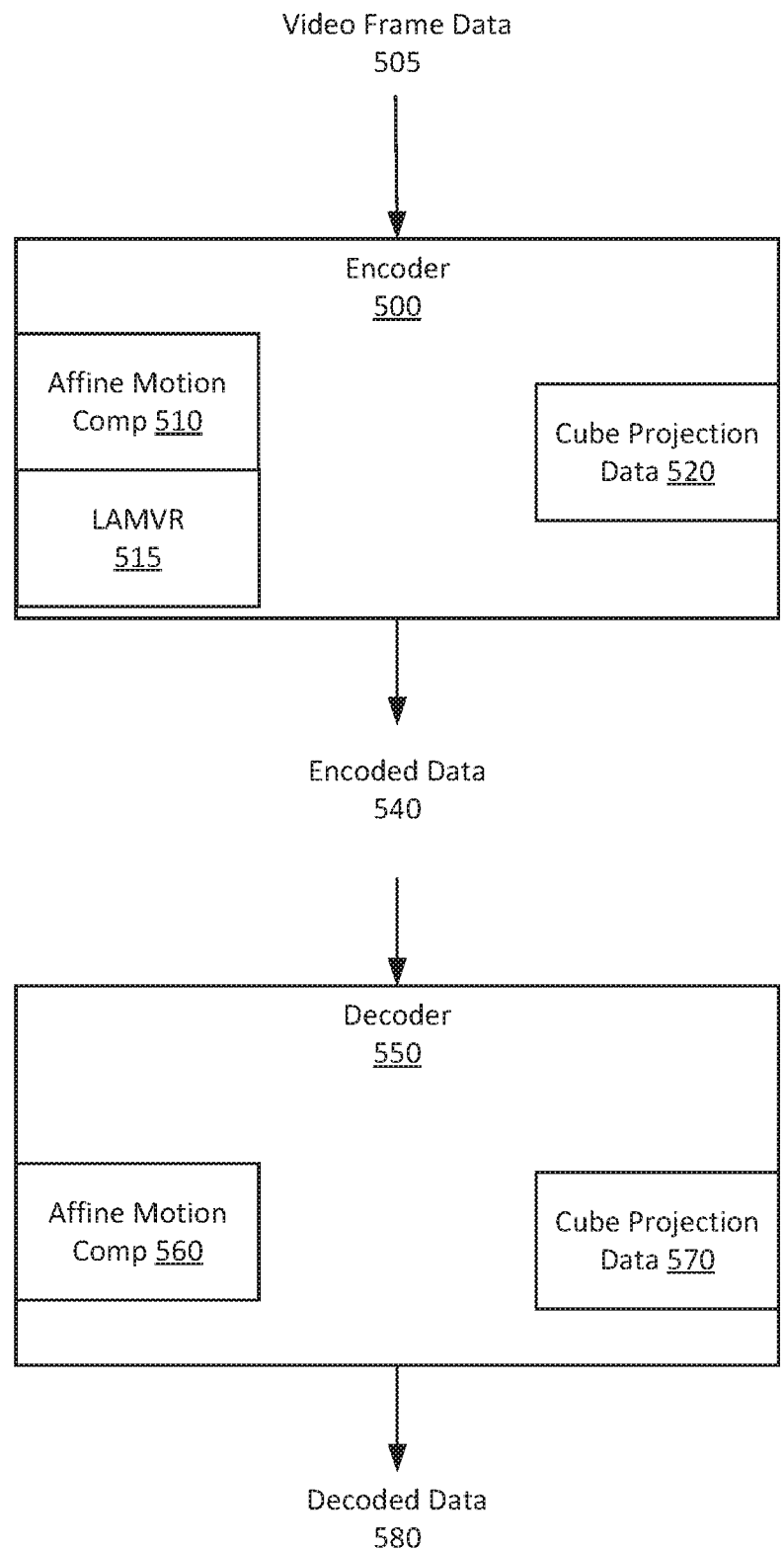
FIG. 5 is an illustration of a coder and decoder to provide affine motion compensation for current picture references according to some embodiments.

FIG. 5 is an illustration of a coder and decoder to provide affine motion compensation for current picture references according to some embodiments. In some embodiments, an encoder 500, which may be a portion of a computing apparatus or system (such as illustrated in any of FIGS. 6-8), is to receive video frame data 505 for encoding to provide compression of the data for transmission or storage. In some embodiments, in addition to commonly known elements of a video encoder, the encoder 500 includes an affine motion compensation component or 510, wherein the affine motion compensation extends to current picture references when conditions allow such operation. In some embodiments, allows sub-pel motion vector resolution for certain blocks. In some embodiments, the encoder 500 includes a component or capability to determine if the affine motion compensation 510 can be applied for a particular block, including determining whether reference pixel positions or sub-blocks of the block are located in an invalid area, which may result in prevention of affine compensation application or allowance only if certain limitations are met.

In some embodiments, the encoder further includes a LAMVR component or capability 515, wherein, for pixels along the edge of a cube face with a discontinuity from the neighboring samples in the coded picture, the encoder may apply LAMVR to indicate integer pel motion vector differences to avoid sub-pel filter computations that use pixels from discontinuous faces.

In some embodiments, the encoder 500 further includes cube projection data or other knowledge 520, wherein such data or other knowledge describes a cube face layout, including locations, discontinuities, and rotations for cube faces. For example, the data or other knowledge may describe the cube faces as these are illustrated in FIG. 3.

The encoder 500 is to generate encoded data 540 for transmission or storage, wherein the encoded data may include affine motion compensation if appropriate for the input data.

In some embodiments, a decoder 550 (which may be a component of a same or different computing apparatus or system than the encoder 500) is to receive the encoded data 540 from transmission or storage, and is to generate decoded data 580 from the processing of the encoded data 540. In some embodiments, the decoder includes an affine compensation decoding component or capability 560. In some embodiments, components of a decoder designed for inter-frame affine prediction may be re-applied to intra current picture referencing with affine motion compensation mode. In some embodiments, the decoder 550 further includes cube projection data or other knowledge 570, wherein such data or other knowledge describes a cube face layout, including locations, discontinuities, and rotations for cube faces.

Figure 6:
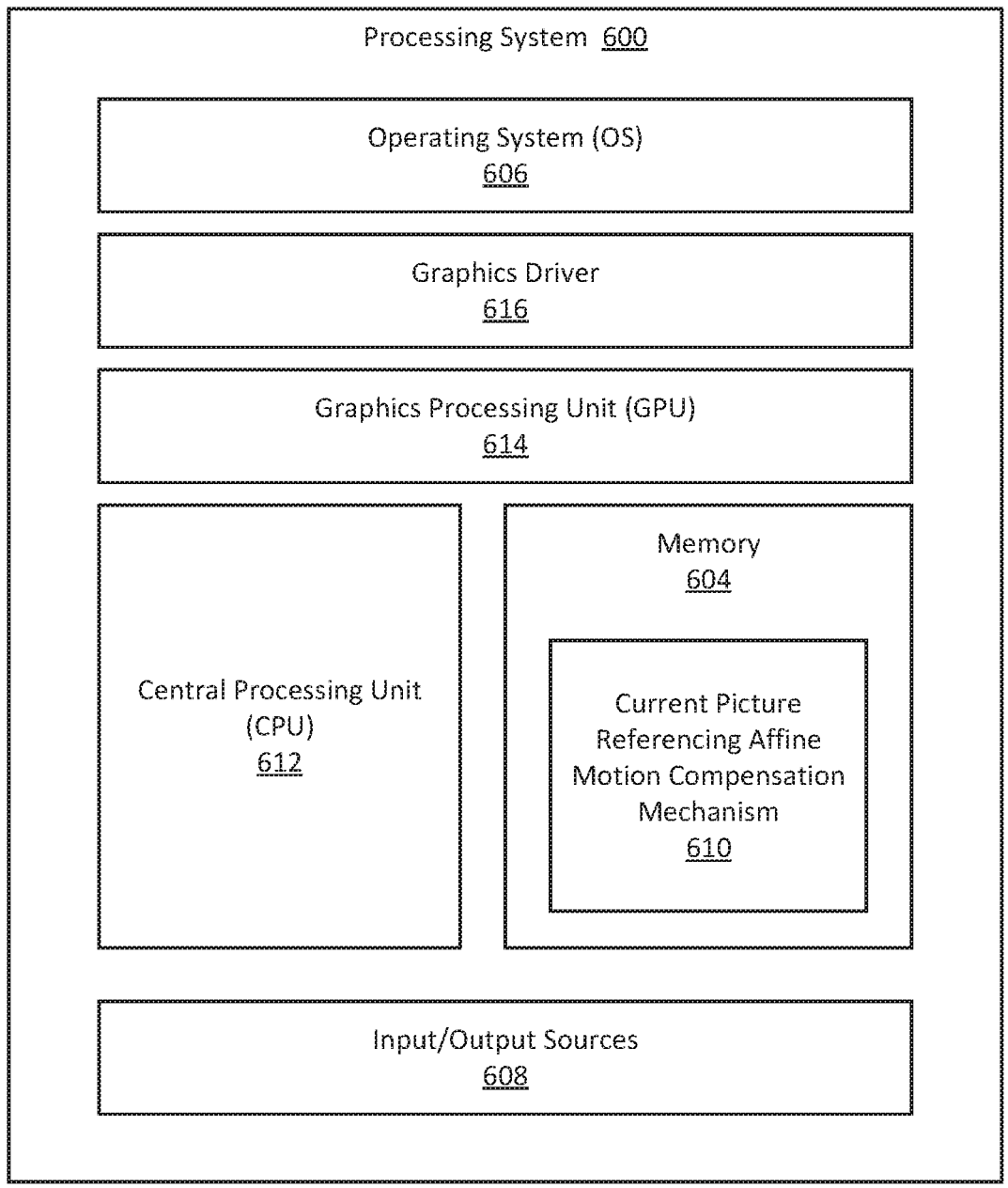
FIG. 6 illustrates a novel current picture referencing affine motion compensation mechanism according to some embodiments.

FIG. 6 illustrates a novel current picture referencing affine motion compensation mechanism according to some embodiments. For example, in one embodiment, a current picture affine mechanism 610 of FIG. 6 may be employed or hosted by computing device 600, such as computing device 700 of FIG. 7. Computing device 600 represents a communication and data processing device including or representing any number and type of smart devices, such as (without limitation) smart command devices or intelligent personal assistants, home/office automation system, home appliances (e.g., security systems, washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet based cable television set-top boxes, etc.), global positioning system (GPS)-based devices, etc.

In some embodiments, computing device 600 may include (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats or ships, etc.), autonomous equipment (self-operating construction vehicles, self-operating medical equipment, etc.), and/or the like. Further, "autonomous vehicles" are not limited to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 600 may include a cloud computing platform consisting of a plurality of server computers, where each server computer employs or hosts a multifunction perceptron mechanism. For example, automatic ISP tuning may be performed using component, system, and architectural setups described earlier in this document. For example, some of the aforementioned types of devices may be used to implement a custom learned procedure, such as using field-programmable gate arrays (FPGAs), etc.

Further, for example, computing device 600 may include a computer platform hosting an integrated circuit ("IC"), such as a system on a chip ("SoC" or "SOC"), integrating various hardware and/or software components of computing device 600 on a single chip.

As illustrated, in one embodiment, computing device 600 may include any number and type of hardware and/or software components, such as (without limitation) graphics processing unit 614 ("GPU" or simply "graphics processor"), graphics driver 616 (also referred to as "GPU driver", "graphics driver logic", "driver logic", user-mode driver (UMD), user-mode driver framework (UMDF), or simply "driver"), central processing unit 612 ("CPU" or simply "application processor"), memory 604, network devices, drivers, or the like, as well as input/output (TO) sources 608, such as touchscreens, touch panels, touch pads, virtual or regular keyboards, virtual or regular mice, ports, connectors, etc. Computing device 600 may include operating system (OS) serving as an interface between hardware and/or physical resources of computing device 600 and a user.

It is to be appreciated that a lesser or more equipped system than the example described above may be preferred for certain implementations. Therefore, the configuration of computing device 600 may vary from implementation to implementation depending upon numerous factors, such as price constraints, performance requirements, technological improvements, or other circumstances.

Embodiments may be implemented as any or a combination of: one or more microchips or integrated circuits interconnected using a system board, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

In one embodiment, current picture affine mechanism 610 may be hosted by memory 604 of computing device 600. In another embodiment, current picture affine mechanism 610 may be hosted by or be part of operating system 606 of computing device 600. In another embodiment, current picture affine mechanism 610 may be hosted or facilitated by graphics driver 616. In yet another embodiment, current picture affine mechanism 610 may be hosted by or part of graphics processing unit 614 ("GPU" or simply "graphics processor") or firmware of graphics processor 614. For example, current picture affine mechanism 610 may be embedded in or implemented as part of the processing hardware of graphics processor 612. Similarly, in yet another embodiment, current picture affine mechanism 610 may be hosted by or part of central processing unit 612 ("CPU" or simply "application processor"). For example, current picture affine mechanism 610 may be embedded in or implemented as part of the processing hardware of application processor 612.

In yet another embodiment, current picture affine mechanism 610 may be hosted by or part of any number and type of components of computing device 600, such as a portion of current picture affine mechanism 610 may be hosted by or part of operating system 606, another portion may be hosted by or part of graphics processor 614, another portion may be hosted by or part of application processor 612, while one or more portions of current picture affine mechanism 610 may be hosted by or part of operating system 606 and/or any number and type of devices of computing device 600. It is contemplated that embodiments are not limited to certain implementation or hosting of current picture affine mechanism 610 and that one or more portions or components of current picture affine mechanism 610 may be employed or implemented as hardware, software, or any combination thereof, such as firmware.

Computing device 600 may host network interface(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), 5th Generation (5G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media (including a non-transitory machine-readable or computer-readable storage medium) having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic tape, magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 7:
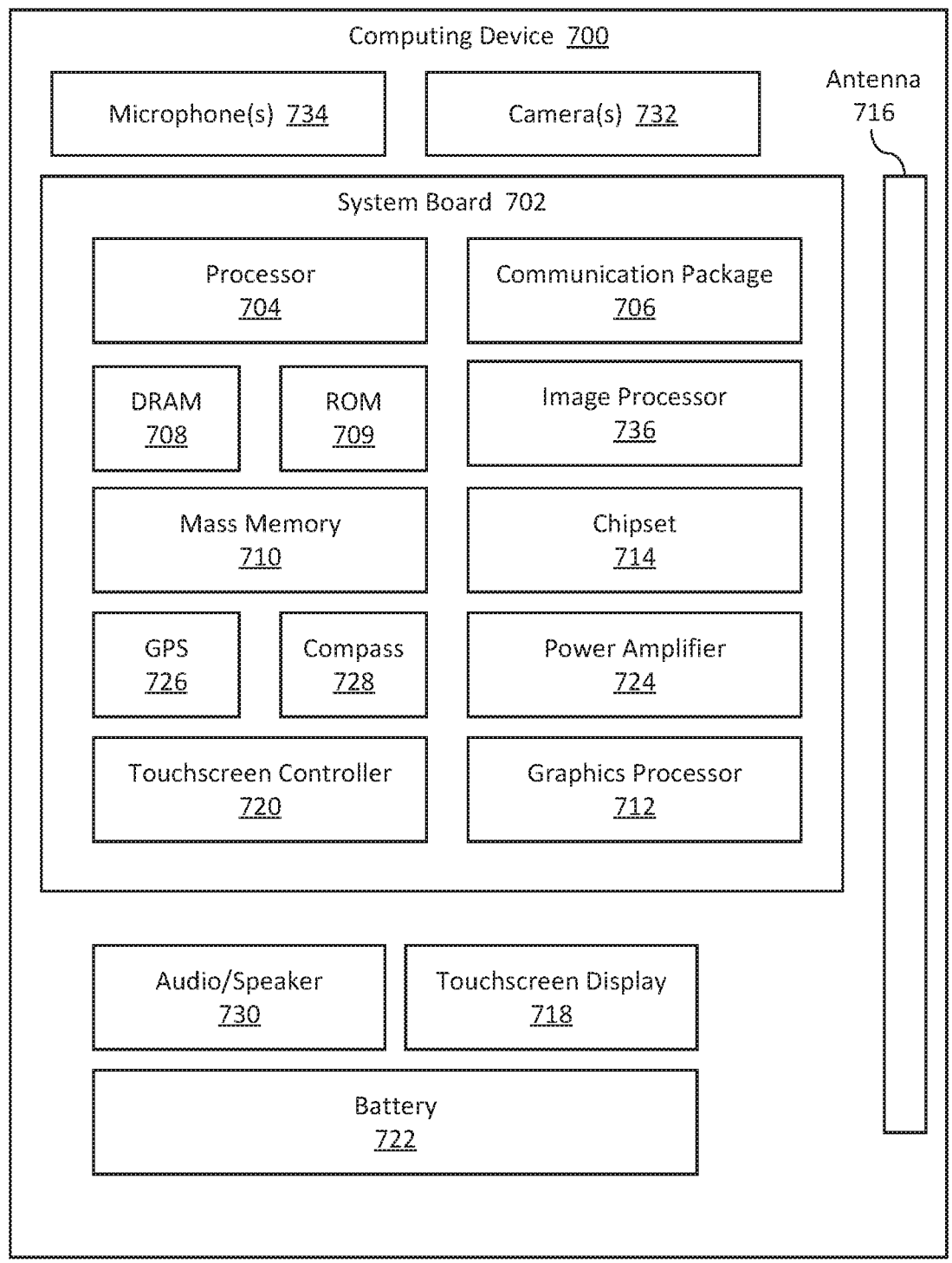
FIG. 7 illustrates a computing device according to some embodiments.

FIG. 7 illustrates a computing device according to some embodiments. It is contemplated that details of computing device 700 may be the same as or similar to details of processing system 600 of FIG. 6 and thus for brevity, certain of the details discussed with reference to processing system 600 of FIG. 6 are not discussed or repeated hereafter. Computing device 700 houses a system board 702 (which may also be referred to as a motherboard, main circuit board, or other terms)). The board 702 may include a number of components, including but not limited to a processor 704 and at least one communication package or chip 706. The communication package 706 is coupled to one or more antennas 716. The processor 704 is physically and electrically coupled to the board 702.

Depending on its applications, computing device 700 may include other components that may or may not be physically and electrically coupled to the board 702. These other components include, but are not limited to, volatile memory (e.g., DRAM) 708, nonvolatile memory (e.g., ROM) 709, flash memory (not shown), a graphics processor 712, a digital signal processor (not shown), a crypto processor (not shown), a chipset 714, an antenna 716, a display 718 such as a touchscreen display, a touchscreen controller 720, a battery 722, an audio codec (not shown), a video codec (not shown), a power amplifier 724, a global positioning system (GPS) device 726, a compass 728, an accelerometer (not shown), a gyroscope (not shown), a speaker or other audio element 730, one or more cameras 732, a microphone array 734, and a mass storage device (such as hard disk drive) 710, compact disk (CD) (not shown), digital versatile disk (DVD) (not shown), and so forth). These components may be connected to the system board 702, mounted to the system board, or combined with any of the other components.

The communication package 706 enables wireless and/or wired communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 706 may implement any of a number of wireless or wired standards or protocols, including but not limited to Wi-Fi (IEEE 802.11 family), WiMAX (IEEE 802.16 family), IEEE 802.20, long term evolution (LTE), Ev-DO (Evolution Data Optimized), HSPA+, HSDPA+, HSUPA+, EDGE Enhanced Data rates for GSM evolution), GSM (Global System for Mobile communications), GPRS (General Package Radio Service), CDMA (Code Division Multiple Access), TDMA (Time Division Multiple Access), DECT (Digital Enhanced Cordless Telecommunications), Bluetooth, Ethernet derivatives thereof, as well as any other wireless and wired protocols that are designated as 3G, 4G, 5G, and beyond. The computing device 700 may include a plurality of communication packages 706. For instance, a first communication package 706 may be dedicated to shorter range wireless communications such as Wi-Fi and Bluetooth and a second communication package 706 may be dedicated to longer range wireless communications such as GSM, EDGE, GPRS, CDMA, WiMAX, LTE, Ev-DO, and others.

The cameras 732 including any depth sensors or proximity sensor are coupled to an optional image processor 736 to perform conversions, analysis, noise reduction, comparisons, depth or distance analysis, image understanding, and other processes as described herein. The processor 704 is coupled to the image processor to drive the process with interrupts, set parameters, and control operations of image processor and the cameras. Image processing may instead be performed in the processor 704, the graphics processor 712, the cameras 732, or in any other device.

In various implementations, the computing device 700 may be a laptop, a netbook, a notebook, an Ultrabook, a smartphone, a tablet, a personal digital assistant (PDA), an ultra-mobile PC, a mobile phone, a desktop computer, a server, a set-top box, an entertainment control unit, a digital camera, a portable music player, or a digital video recorder. The computing device may be fixed, portable, or wearable. In further implementations, the computing device 700 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Figure 8:
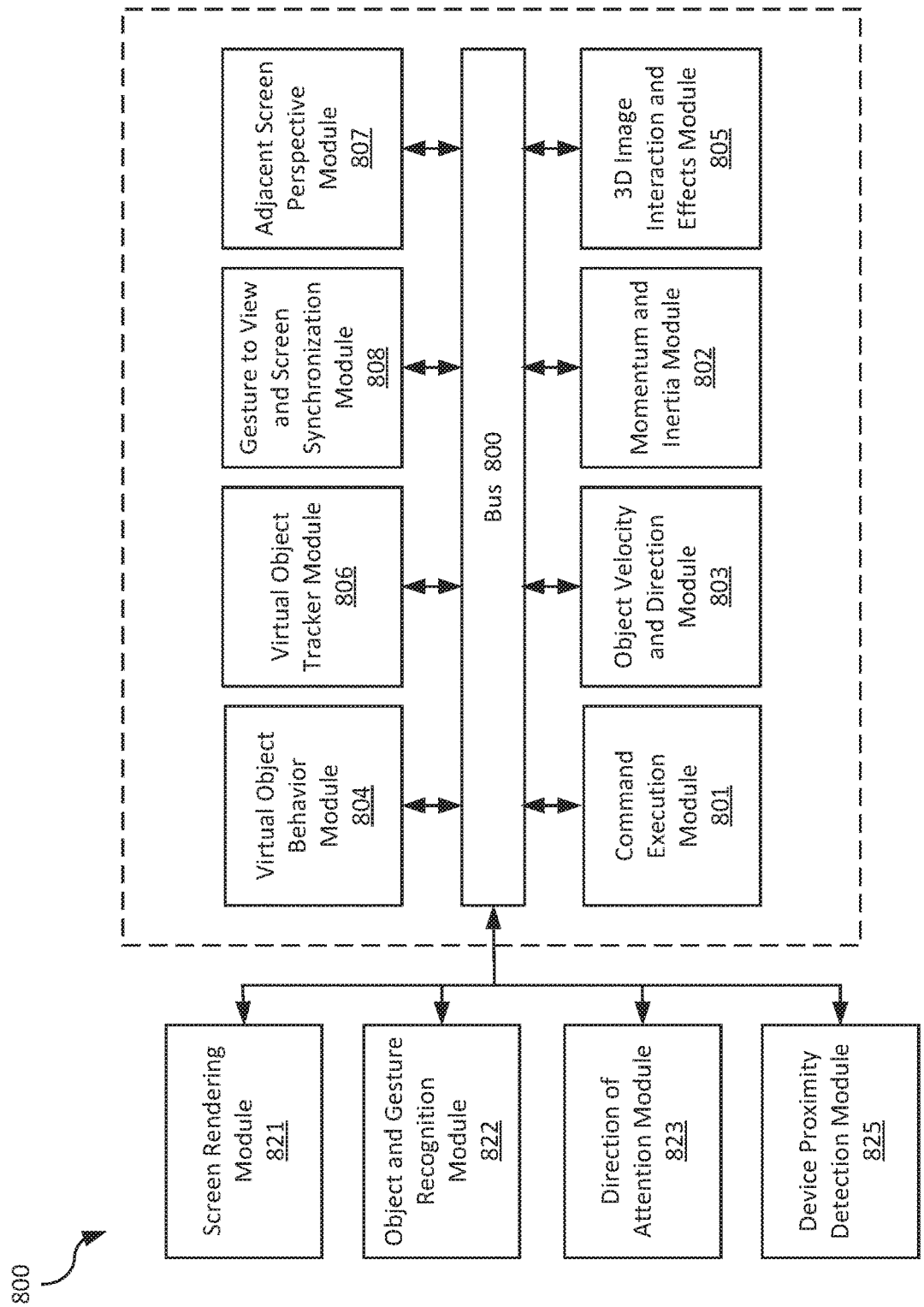
FIG. 8 illustrates an embodiment of a computing environment according to some embodiments.

FIG. 8 illustrates an embodiment of a computing environment according to some embodiments. The computing environment 800 includes capability of supporting operations discussed herein. The modules and systems can be implemented in a variety of different hardware architectures and form factors including that shown in FIG. 7.

The Command Execution Module 801 includes a central processing unit to cache and execute commands and to distribute tasks among the other modules and systems shown. It may include an instruction stack, a cache memory to store intermediate and final results, and mass memory to store applications and operating systems. The Command Execution Module 801 may also serve as a central coordination and task allocation unit for the system.

The Screen Rendering Module 821 draws objects on the one or more multiple screens for the user to see. It can be adapted to receive the data from the Virtual Object Behavior Module 804, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module 821 could further be adapted to receive data from the Adjacent Screen Perspective Module 807, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 807 could send data to the Screen Rendering Module 821 to suggest, for example in shadow form, one or more target landing areas for the virtual object on that track to a user's hand movements or eye movements.

The Object and Gesture Recognition Module 822 may be adapted to recognize and track hand and arm gestures of a user. Such a module may be used to recognize hands, fingers, finger gestures, hand movements and a location of hands relative to displays. For example, the Object and Gesture Recognition Module 822 could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition Module 822 may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition Module 822 using one or more cameras without the benefit of a touch surface.

The Direction of Attention Module 823 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 822 to ensure that the gestures or commands are associated with the appropriate library for the active display. Similarly, if the user is looking away from all of the screens, then commands can be ignored.

The Device Proximity Detection Module 825 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition Module 822. For a display device, it may be considered by the Adjacent Screen Perspective Module 807.

The Virtual Object Behavior Module 804 is adapted to receive input from the Object Velocity and Direction Module 803, and to apply such input to a virtual object being shown in the display. Thus, for example, the Object and Gesture Recognition Module 822 would interpret a user gesture and by mapping the captured movements of a user's hand to recognized movements, the Virtual Object Tracker Module 806 would associate the virtual object's position and movements to the movements as recognized by Object and Gesture Recognition Module 822, the Object Velocity and Direction Module 803 would capture the dynamics of the virtual object's movements, and the Virtual Object Behavior Module 804 would receive the input from the Object Velocity and Direction Module 803 to generate data that would direct the movements of the virtual object to correspond to the input from the Object Velocity and Direction Module 803.

The Virtual Object Tracker Module 806 on the other hand may be adapted to track where a virtual object should be located in three-dimensional space in a vicinity of a display, and which body part of the user is holding the virtual object, based on input from the Object and Gesture Recognition Module 822. The Virtual Object Tracker Module 806 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 808, receives the selection of the view and screen or both from the Direction of Attention Module 823 and, in some cases, voice commands to determine which view is the active view and which screen is the active screen. It then causes the relevant gesture library to be loaded for the Object and Gesture Recognition Module 822. Various views of an application on one or more screens can be associated with alternative gesture libraries or a set of gesture templates for a given view.

The Adjacent Screen Perspective Module 807, which may include or be coupled to the Device Proximity Detection Module 825, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 807 may, in this way, determine coordinates of an adjacent screen relative to its own screen coordinates. Thus, the Adjacent Screen Perspective Module 807 may determine which devices are in proximity to each other, and further potential targets for moving one or more virtual objects across screens. The Adjacent Screen Perspective Module 807 may further allow the position of the screens to be correlated to a model of three-dimensional space representing all of the existing objects and virtual objects.

The Object Velocity and Direction Module 803 may be adapted to estimate the dynamics of a virtual object being moved, such as its trajectory, velocity (whether linear or angular), momentum (whether linear or angular), etc. by receiving input from the Virtual Object Tracker Module 806. The Object Velocity and Direction Module 803 may further be adapted to estimate dynamics of any physics forces, by for example estimating the acceleration, deflection, degree of stretching of a virtual binding, etc. and the dynamic behavior of a virtual object once released by a user's body part. The Object Velocity and Direction Module 803 may also use image motion, size and angle changes to estimate the velocity of objects, such as the velocity of hands and fingers.

The Momentum and Inertia Module 802 can use image motion, image size, and angle changes of objects in the image plane or in a three-dimensional space to estimate the velocity and direction of objects in the space or on a display. The Momentum and Inertia Module 802 is coupled to the Object and Gesture Recognition Module 822 to estimate the velocity of gestures performed by hands, fingers, and other body parts and then to apply those estimates to determine momentum and velocities to virtual objects that are to be affected by the gesture.

The 3D Image Interaction and Effects Module 805 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 801, 802, 803, 804, 805, 808, 807, and 808 are connected via an interconnect or a bus, such as bus 809.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

EXAMPLES

In some embodiments, an apparatus includes one or more processors for processing of data; a memory for storage of data including video data; and an encoder to encode video data to generate encoded video data, wherein the encoder includes a component to provide affine motion compensation for current picture references in the video data.

In some embodiments, the encoder further includes data regarding cube projections for the video data, including cube face locations, discontinuities, and rotations in a cube projection.

In some embodiments, the encoder is further to determine wherein a block of the video data is eligible for affine motion compensation.

In some embodiments, the determination of eligibility for affine motion compensation includes determining whether one or more pixel positions of the block are located in an invalid area.

In some embodiments, the determination of eligibility for affine motion compensation includes determining whether one or more sub-blocks of the block are located in an invalid area.

In some embodiments, the encoding of the video data is to provide sub-pel motion vector resolution for a block of the video data.

In some embodiments, the encoder includes a locally adaptive motion vector resolution (LAMVR) component, wherein the encoder is to utilize the LAMVR component to avoid sub-pel filter computations that use pixels from discontinuous faces of a cube face.

In some embodiments, the apparatus further includes a decoder to decode the encoded video data, the decoder including a component to decode affine motion compensation for current picture references in the encoded video data.

In some embodiments, the decoder further includes data regarding cube projections, including cube face locations, discontinuities, and rotations in a cube projection in the encoded video data.

In some embodiments, one or more non-transitory computer-readable storage mediums having stored thereon data representing sequences of instructions that, when executed by one or more processors, cause the one or more processors to perform operations receiving video data for encoding; encoding the video data utilizing a video encoder, wherein the encoding of the video data includes applying affine motion compensation for current picture references in the video data; and outputting encoded video data.

In some embodiments, encoding the video data includes application of knowledge data regarding cube projections in the video data, including cube face locations, discontinuities, and rotations in a cube projection.

In some embodiments, the instructions further include instructions for determining wherein a block in the video data is eligible for affine motion compensation.

In some embodiments, the determination of eligibility for affine motion compensation includes determining whether one or more pixel positions of the block are located in an invalid area.

In some embodiments, the determination of eligibility for affine motion compensation includes determining whether one or more sub-blocks of the block are located in an invalid area.

In some embodiments, the encoding of the video data includes providing sub-pel motion vector resolution for a block in the video data.

In some embodiments, the instructions further include instructions for utilizing a locally adaptive motion vector resolution (LAMVR) component to avoid sub-pel filter computations that use pixels from discontinuous faces of a cube face in the video data.

In some embodiments, the instructions further include instructions for decoding the encoded video data, wherein the decoding of the video data includes decoding affine motion compensation for current picture references in the video data.

In some embodiments, decoding the video data includes application of knowledge data regarding cube projections in the video data, including cube face locations, discontinuities, and rotations in a cube projection.

In some embodiments, a method includes receiving video data for encoding; encoding the video data utilizing a video encoder, wherein the encoding of the video data includes applying affine motion compensation for current picture references in the video data; and outputting encoded video data.

In some embodiments, encoding the video data includes application of knowledge data regarding cube projections in the video data, including cube face locations, discontinuities, and rotations in a cube projection.

In some embodiments, the method further includes determining wherein a block in the video data is eligible for affine motion compensation.

In some embodiments, the determination of eligibility for affine motion compensation includes determining whether one or more pixel positions of the block are located in an invalid area.

In some embodiments, the determination of eligibility for affine motion compensation includes determining whether one or more sub-blocks of the block are located in an invalid area.

In some embodiments, the encoding of the video data includes providing sub-pel motion vector resolution for a block in the video data.

In some embodiments, the method further includes utilizing a locally adaptive motion vector resolution (LAMVR) component to avoid sub-pel filter computations that use pixels from discontinuous faces of a cube face in the video data.

In some embodiments, the method further includes decoding the encoded video data, wherein the decoding of the video data includes decoding affine motion compensation for current picture references in the video data.

In some embodiments, decoding the video data includes application of knowledge data regarding cube projections in the video data, including cube face locations, discontinuities, and rotations in a cube projection.

In some embodiments, an apparatus includes means for receiving video data for encoding; means for encoding the video data utilizing a video encoder, wherein the encoding of the video data includes applying affine motion compensation for current picture references in the video data; and means for outputting encoded video data.

In some embodiments, encoding the video data includes application of knowledge data regarding cube projections in the video data, including cube face locations, discontinuities, and rotations in a cube projection.

In some embodiments, the apparatus further includes means for determining wherein a block in the video data is eligible for affine motion compensation.

In some embodiments, the determination of eligibility for affine motion compensation includes determining whether one or more pixel positions of the block are located in an invalid area.

In some embodiments, the determination of eligibility for affine motion compensation includes determining whether one or more sub-blocks of the block are located in an invalid area.

In some embodiments, the encoding of the video data includes providing sub-pel motion vector resolution for a block in the video data.

In some embodiments, the apparatus further includes means for utilizing a locally adaptive motion vector resolution (LAMVR) component to avoid sub-pel filter computations that use pixels from discontinuous faces of a cube face in the video data.

In some embodiments, the apparatus further includes means for decoding the encoded video data, wherein the decoding of the video data includes decoding affine motion compensation for current picture references in the video data.

In some embodiments, decoding the video data includes application of knowledge data regarding cube projections in the video data, including cube face locations, discontinuities, and rotations in a cube projection.

In some embodiments, a computing system includes one or more processors for processing of data; a dynamic random access memory (DRAM) for storage of data including video data; a network interface to communicate data via network; an encoder to encode video data to generate encoded video data, wherein the encoder includes a component to provide affine motion compensation for current picture references in the video data; and a decoder to decode the encoded video data, wherein the decoder includes a component to decode affine motion compensation for current picture references in encoded video data.

In some embodiments, the encoder further includes data regarding cube projections for the video data, including cube face locations, discontinuities, and rotations in a cube projection.

In some embodiments, the encoder is further to determine wherein a block of the video data is eligible for affine motion compensation.

In some embodiments, the encoding of the video data is to provide sub-pel motion vector resolution for a block of the video data.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising:
    one or more processors for processing of data;
    a memory for storage of data including video data; and
    an encoder to encode video data to generate encoded video data and provide affine motion compensation for current picture references in the video data, wherein the encoded video data includes data relating to cube projections for the video data including cube face locations, discontinuities, and rotations in a cube projection such that the encoder to track the cube face locations, the discontinuities, and the rotations in the cube projection for selection of one or more search neighborhoods for motion estimation for affine control point motion vectors associated with the video data, wherein the encoder to determine a block of the video data eligible for the affine motion compensation, wherein determining eligibility for affine motion compensation includes determining one or more of whether one or more pixel positions of the block are located in an invalid area or whether one or more sub-blocks of the block are located in an invalid area.

2. The apparatus of claim 1, wherein the encoding of the video data is to provide sub-pel motion vector resolution for a block of the video data.

3. The apparatus of claim 2, wherein the encoder includes a locally adaptive motion vector resolution (LAMVR) component, wherein the encoder is to utilize the LAMVR component to avoid sub-pel filter computations that use pixels from discontinuous faces of a cube face.

4. The apparatus of claim 1, further comprising a decoder to decode the encoded video data, the decoder including a component to decode affine motion compensation for current picture references in the encoded video data, wherein the decoder further includes data regarding cube projections, including cube face locations, discontinuities, and rotations in a cube projection in the encoded video data.

5. One or more non-transitory computer-readable storage mediums having stored thereon data representing sequences of instructions that, when executed by one or more processors, cause the one or more processors to perform operations comprising:
    receiving video data for encoding;
    encoding the video data utilizing a video encoder, wherein the encoding of the video data includes applying affine motion compensation for current picture references in the video data, wherein encoding the video data includes application of knowledge data relating to cube projections in the video data, including cube face locations, discontinuities, and rotations in a cube projection such that the encoder to track the cube face locations, the discontinuities, and the rotations in the cube projection for selection of one or more search neighborhoods for motion estimation for affine control point motion vectors associated with the video data;
    determining a block in the video data eligible for affine motion compensation, wherein determining eligibility for affine motion compensation includes determining one or more of whether one or more pixel positions of the block are located in an invalid area or whether one or more sub-blocks of the block are located in an invalid area; and
    outputting encoded video data.

6. The one or more storage mediums of claim 5, wherein determining eligibility for affine motion compensation includes determining whether one or more pixel positions of the block are located in an invalid area.

7. The one or more storage mediums of claim 5, wherein determining eligibility for affine motion compensation includes determining whether one or more sub-blocks of the block are located in an invalid area.

8. The one or more storage mediums of claim 5, wherein the encoding of the video data includes providing sub-pel motion vector resolution for a block in the video data.

9. The one or more storage mediums of claim 8, wherein the operations further comprise:

utilizing a locally adaptive motion vector resolution (LAMVR) component to avoid sub-pel filter computations that use pixels from discontinuous faces of a cube face in the video data.

10. The one or more storage mediums of claim 5, wherein the operations further comprise facilitating decoding the encoded video data, wherein the decoding of the video data includes decoding affine motion compensation for current picture references in the video data, wherein decoding the video data includes application of knowledge data regarding cube projections in the video data, including cube face locations, discontinuities, and rotations in a cube projection.

11. A method comprising:
  receiving video data for encoding;
  encoding the video data utilizing a video encoder, wherein the encoding of the video data includes applying affine motion compensation for current picture references in the video data, wherein encoding the video data includes application of knowledge data relating to cube projections in the video data, including cube face locations, discontinuities, and rotations in a cube projection such that the encoder to track the cube face locations, the discontinuities, and the rotations in the cube projection for selection of one or more search neighborhoods for motion estimation for affine control point motion vectors associated with the video data;
  determining a block in the video data eligible for affine motion compensation, wherein determining eligibility for affine motion compensation includes determining one or more of whether one or more pixel positions of the block are located in an invalid area or whether one or more sub-blocks of the block are located in an invalid area; and
  outputting encoded video data.

12. The method of claim 11, wherein the encoding of the video data includes providing sub-pel motion vector resolution for a block in the video data.

13. The method of claim 11, further comprising:
  utilizing a locally adaptive motion vector resolution (LAMVR) component to avoid sub-pel filter computations that use pixels from discontinuous faces of a cube face in the video data.

14. The method of claim 11, further comprising facilitating decoding of the encoded video data, wherein the decoding of the video data includes decoding affine motion compensation for current picture references in the video data, wherein decoding the video data includes application of knowledge data regarding cube projections in the video data, including cube face locations, discontinuities, and rotations in a cube projection.

* * * * *